United States Patent
Naclerio (12) 
(10) Patent No.: US 6,448,907 B1
(45) Date of Patent: Sep. 10, 2002

(54) AIRLINE PASSENGER MANAGEMENT SYSTEM

(76) Inventor: Nicholas J. Naclerio, 7463 Cross Gate La., Alexandria, VA (US) 22315

( * ) Notice: Subject to any disclaimer, the term of this patent is extended or adjusted under 35 U.S.C. 154(b) by 0 days.

(21) Appl. No.: 10/050,530

(22) Filed: Jan. 18, 2002

(51) Int. Cl.$^7$ .................................................. G08B 21/00
(52) U.S. Cl. ................. 340/945; 244/122 R; 280/801.1; 297/468; 297/477; 340/457.1
(58) Field of Search .................................. 340/945, 963, 340/457.1; 280/801.1, 735; 297/468, 477; 244/122 R (56) References Cited

U.S. PATENT DOCUMENTS

| | | | |
|---|---|---|---|
| 3,351,381 A | 11/1967 | Boblitz | 297/385 |
| 3,841,328 A | * 10/1974 | Jensen | 244/122 R |
| 3,891,272 A | 6/1975 | Takada | 297/386 |
| 4,432,119 A | 2/1984 | Schwark et al. | 24/603 |
| 4,936,600 A | 6/1990 | Kawai et al. | 280/804 |
| 5,076,609 A | 12/1991 | Park | 280/804 |
| 5,224,736 A | 7/1993 | Sedlmayer et al. | 280/807 |
| 5,555,458 A | 9/1996 | Large | 340/945 |
| 5,586,503 A | 12/1996 | Rehorn | 104/241 |
| 5,655,619 A | 8/1997 | Suran et al. | 180/270 |
| 5,890,084 A | 3/1999 | Halasz et al. | 701/45 |
| 6,002,325 A | 12/1999 | Conaway | 340/384.1 |
| 6,059,066 A | 5/2000 | Lary | 180/268 |
| 6,079,744 A | 6/2000 | Husby et al. | 280/801.1 |
| 6,102,440 A | 8/2000 | Bergkessel | 280/808 |
| 6,203,059 B1 | 3/2001 | Mazur et al. | 280/735 |

FOREIGN PATENT DOCUMENTS

| | | |
|---|---|---|
| GB | 2292126 | 2/1996 |

* cited by examiner

*Primary Examiner*—Brent A. Swarthout
(74) *Attorney, Agent, or Firm*—Richard C. Litman (57) ABSTRACT

An airline passenger management system selectively and positively retains passengers within their seats, thereby eliminating potential airborne threats due to terrorists being able to move about the cabin of the aircraft. The system includes a seat belt latch assembly having a mechanism which selectively disables the latch release, thereby preventing the passenger from releasing his/her seat belt latch and restraining the passenger in his/her seat. The system further includes monitoring and control panels, with a monitoring panel in the passenger cabin and a control panel on the flight deck. These panels indicate the status of each passenger position, with the flight deck panel including a belt latch release control for each passenger position. The system provides for selective release of limited numbers of passengers at any one time during flight, and considers the risk level of each passenger according to statistics entered in a database prior to flight.

20 Claims, 6 Drawing Sheets

AIRLINE PASSENGER MANAGEMENT SYSTEM

BACKGROUND OF THE INVENTION

1. Field of the Invention

The present invention relates generally to passenger control systems, and more specifically to a system for monitoring and controlling movement of passengers on board an airliner. The present system includes a remotely controllable belt latch assembly for each passenger, with an integrated information system and/or crewmember serving to disable or unlock the novel seat belt latch release mechanism selectively for one or more of the passengers in order to retain the passenger(s) in their seats as desired by the crew.

2. Description of the Related Art

While airline hijackings have occurred on several occasions in the past, it was not until the events of Sep. 11, 2001 that the potential use of such aircraft for mass destruction was seen by most people. While boarding checks and other security measures have been in place for many years, the events of Sept. 11 have driven home the point that it is possible for potential terrorists to carry objects on board which under virtually any other circumstances would be completely innocuous, but when placed in the hands of terrorists on an airliner, become deadly weapons. There is thus considerable concern that regardless of the security measures taken before boarding, there is still some element of danger present if significant numbers of potentially dangerous passengers are able to roam freely within the aircraft cabin during flight.

The present invention provides a solution to this potential problem by means of a computerized system installed in the aircraft, for controlling the ability of passengers to release their seat belt latches. The present invention includes a novel latch assembly for each passenger seat belt, with each latch assembly having a remotely actuated control which when activated, disables the belt latch release mechanism to restrain the passenger within the seat. The present system provides for a computer managed or crewmember controlled release of passengers on a selective basis, with the risk level of the passenger(s) taken into account before release during flight. Safeguards are built into the system to provide for automatic release in the event of an electrical power failure or other emergency, or upon reaching the arrival gate after landing.

A discussion of the related art of which the present inventor is aware, and its differences and distinctions from the present invention, is provided below.

U.S. Pat. No. 3,351,381 issued on Nov. 7, 1967 to Oliver W. Boblitz, titled "Automatic Safety Belt Devices," describes a system for use in automobiles or aircraft, for alerting seat occupants of the need to fasten their seat belts securely. The Boblitz system includes a weight sensor installed within each seat and a switch contact within each belt latch assembly, for sending a signal if the latch assembly has not been latched. The disclosure of these devices of the Boblitz '381 U.S. Patent, is incorporated herein by reference. Such devices are conventional and well known in the art. Boblitz also provides an electrical switch with each belt for indicating when the belt has tension applied to it, i.e., when the belt is tightly fastened around the seat occupant. The present invention includes a device performing the same function, but having a different structure. The Boblitz system sends a signal to an annunciator panel whenever a seat is occupied and the corresponding seat belt is only loosely fastened about the occupant. While the present invention incorporates technology which also accomplishes this function, the present invention goes even farther by providing a seat belt latch assembly which cannot be unlatched by the seat occupant, whenever the latch opening mechanism is disabled by remote means. Boblitz does not disclose such a mechanism, and thus cannot restrain passengers within their seats, as can the present invention.

U.S. Pat. No. 3,891,272 issued on Jun. 24, 1975 to Tazeko Takada, titled "Motor Vehicle Safety Devices," describes a seat belt and ignition interlock system, as was applied to new automobiles sold in the U.S. for a brief period in the mid-1970s. The Takada system also includes a weight sensor for each seat and a switch mechanism for each seat belt latch to indicate whether or not the belt latch is fastened. However, as in the Boblitz '381 U.S. Patent discussed immediately above, Takada does not provide any means of remotely disabling the latch release mechanism in order to restrain passengers in their seats as desired, which function and structure are parts of the present invention.

U.S. Pat. No. 4,432,119 issued on Feb. 21, 1984 to O. Jay Schwark et al., titled "Electrically Released Seat Belt Buckle," describes a seat belt latch mechanism including an electrical solenoid therewith. The solenoid actuates a lever which bears against the belt tongue retaining member within the latch when actuated, to release the opposite seat belt tongue member from the latch remotely and automatically. The Schwark et al. latch release mechanism teaches away from the present invention by providing for remote release of the seat belt latch, rather than providing for remote disabling of the seat belt latch release mechanism, as is accomplished by the present invention. The Schwark et al. apparatus would do nothing to retain passengers within their seats, as is accomplished by the present system.

U.S. Pat. No. 4,936,600 issued on Jun. 26, 1990 to Osamu Kawai et al., titled "Passive Seat Belt System," describes an electronic system for preventing lockup of an automated automobile seat belt system (i.e., "moving mouse" system) under certain conditions. The Kawai et al. system prevents lockup of the belt system when a vehicle door is opened and for a short time after it is closed and when the seat is being adjusted, and also considers vehicle movement in making the determinations. However, Kawai et al. do not disclose any remote means to allow the belt latch assembly to be unlatched, or to remotely prevent a passenger from unlatching the belt assembly, as provided by the present invention. The Kawai et al. system does nothing to retain a passenger in his or her seat, but rather teaches away from this function.

U.S. Pat. No. 5,076,609 issued on Dec. 31, 1991 to Han J. Park, titled "Electronic Control Method Of A Car Safety Belt," describes a control system for a "moving mouse" type passive or automated belt system. The Park system utilizes an electronic controller to determine the status of the various switch states of the system, and reacts accordingly. However, no disclosure is made in the Park '609 U.S. Patent of any means for remotely preventing a passenger from unlatching his or her seat belt. The present invention provides such remote belt unlatching prevention means, for the control of airline passengers in flight.

U.S. Pat. No. 5,224,736 issued on Jul. 6, 1993 to Andreas Sedlmayer et al., titled "Safety Belt Arrangement For Occupants Of Land Vehicles And Aircraft," describes a computerized system which takes into account acceleration and deceleration characteristics of: the vehicle in determining belt lockup. The Sedlmayer et al. system has no effect upon the belt latch mechanism per se. Rather, Sedlmayer et al. only provide a means of locking the belt extension mechanism to preclude further extension of the belt under certain conditions.

U.S. Pat. No. 5,555,458 issued on Sep. 10, 1996 to Darrell Large, titled "Passenger Safety Status Indicator," describes a two way annunciator system for alerting cabin attendants of improper passenger status or seat conditions (e.g., belt unfastened, seat not upright for landing, etc.), and also for alerting the passenger(s) of such conditions as well, for their correction. Large provides an annunciator panel at a cabin crewmember station, as well as individual annunciator panels for each seating position. The master annunciator panel alerts the cabin crew as to the status (either proper or improper) of any passenger restraint and/or seat. The cabin crew can respond audibly to each passenger by means of individual speakers within each seat, and/or may provide visual indication(s) by means of the individual panel of each passenger position. While the present invention utilizes a similar annunciator panel system, it should be noted that the present system goes far beyond the relatively simple system developed by Large. Large does not provide any means for the cabin crew to determine whether a passenger seat belt is loosely or tightly secured, and most importantly, does not provide any seat belt latch mechanism which may be remotely disabled to prevent latch release by the passenger, as provided by the present invention.

U.S. Pat. No. 5,586,503 issued on Dec. 24, 1996 to Don W. Rehorn, titled "Passenger Restraint System," describes a fully automated, mechanically driven system for automatically applying and removing a seat belt across the lap(s) of a passenger(s) seated within a chair lift or the like. The Rehorn system uses a roller to actuate a safety bar, with the bar including a cable run therethrough which in turn actuates the movable end of a seat belt. As the roller is driven in one direction upon launch of the chair lift, it drives the cable to draw the movable end of the seat belt across the safety bar and the laps of the passenger(s). When the chair reaches the other end of its run, the roller is moved in the opposite direction, drawing the movable end of the belt upwardly away from the passenger(s) to allow the passenger(s) to leave the chair. While the Rehorn system provides fully automated securing of a passenger(s) within the seat(s), it does nothing to provide for the release of the belt latch from its opposite member; the belt remains extended and attached at both ends at all times, wish only the movable end translating along the safety bar. Moreover, the relatively simple mechanical system of the Rehorn restraint cannot selectively release one or more of a group of passengers during the time the vehicle is in motion, as can the present system.

U.S. Pat. No. 5,655,619 issued on Aug. 12, 1997 to Michael J. Suran et al., titled "Active Seat Belt Control System," describes a system for selectively locking or unlocking the retraction mechanism of an automotive seat belt. The Suran et al. system utilizes a series of electronic and inertia sensors to either lock or unlock the retractors for the seat belts, depending upon conditions. However, the Suran et al. system does nothing to permit or prevent manual unlatching or opening of the seat belt latch itself, by passengers. The Suran et al. system operates only to lock or unlock the belt retractors. If the belt is unfastened in the first place, or if the passenger releases the belt latch, locking the retractors in accordance with the Suran et al. system does nothing to restrain the passenger within his or her seat. In contrast, the present invention provides such restraint by means of a remotely controlled belt latch release system.

U.S. Pat. No. 5,890,084 issued on Mar. 30, 1999 to Peter T. Halasz et al., titled "Controller For Vehicular Safety Device," describes a system including a series of accelerometers and other sensors for actuating various vehicle safety systems as required. The systems may include automatic roll bar(s), cell phone(s), door lock(s), and/or seat belt pretensioner(s). Insofar as the belt pretensioners are concerned, the Halasz et al. system is related to the Suran et al. system discussed immediately above. As in the Suran et al. system, the Halasz et al. system does not provide any remotely controlled means for preventing release of the seat belt buckle or latch assembly by the passenger(s), as provided by the present invention.

U.S. Pat. No. 6,002,325 issued on Dec. 14, 1999 to Brian J. Conaway, titled "Seat Belt Status Alerting Unit," describes an add-on device for a seat belt latch assembly, which provides an audible signal when the seat belt is latched or unlatched. The Conaway device is a stand-alone unit, with no connection to any other components or systems other than the individual belt latch assembly to which it attaches. Conaway does not provide any means of remotely controlling the belt latching or unlatching process, nor any means for preventing a passenger from unlatching his or her belt, as is provided by the present invention. The Conaway device is purely a notification means, and does nothing to control whether the belt buckle assembly is actually latched or not.

U.S. Pat. No. 6,059,066 issued on May 9, 2000 to Banning G. Lary, titled "Seatbelt Usage Indicator," describes a system comprising one or more lights installed so as to be visible from the exterior of the vehicle, which lights are activated whenever the seat belts are secured for each person in the vehicle. The Lary system is thus more an enforcement device to alert law enforcement officials of the proper use (or lack of use) of seat belts by persons within an automobile. Lary does not provide any means for remotely and selectively locking the belt latch assemblies so as to prevent a person from unlatching his or her belt and thus restraining that person in their seat, as provided by the present invention.

U.S. Pat. No. 6,079,744 issued on Jun. 27, 2000 to Harald S. Husby et al., titled "Device To Detect Seat Belt Buckle Status," describes a system using a magnetoresistive sensor to determine the position of the latch assembly and presence or absence of the mating hasp in the latch assembly. The basic concept behind such devices is well known, e.g., the Boblitz '381 U.S. Patent discussed further above, etc. Husby et al. also provide a resistor in parallel across the switch within the buckle or latch assembly, in order to provide a signal if the assembly is damaged (i.e., the resistance becomes infinite). Such a system may be used to determine if the device has been tampered with, among other things. The present invention includes means for detecting tampering with the belt assembly. One such means which may be used is the Husby system, incorporated herein by reference.

U.S. Pat. No. 6,102,440 issued on Aug. 15, 2000 to Robert Bergkessel, titled "Seat Belt With Compliance Light And Lock," describes a belt assembly having a lockable latch mechanism and a light. The light is completely independent of the latch and locking mechanism, and may be actuated or deactivated independently of the status of the latch. Thus, the annunciator light of the Bergkessel system is completely dependent upon the cooperation of the passenger(s), unlike the present system. Also, the Bergkessel belt latch mechanism must be locked directly and individually by another party. While the Bergkessel U.S. Patent is the only disclosure of which the present inventor is aware which provides a mechanism for preventing a passenger from unlatching a seat belt, Bergkessel still does not provide any means for a person or system to selectively and remotely allow or prevent a passenger(s) from unlatching his or her seat belt, as provided by the present system.

U.S. Pat. No. 6,203,059 issued on Mar. 20, 2001 to Joseph F. Mazur et al., titled "Seat Belt Usage Indicator System," describes a system for determining proper wear of a seat belt. The Mazur et al. system is connected to the conventional air bag system of the vehicle, in order to adjust the airbag deployment power depending upon proper or improper seat belt usage. The Mazur et al. system is thus more closely related to the system of the Husby et al. '744 U.S. Patent discussed further above, than to the present invention. Mazur et al. do not disclose any means for positively securing a seat belt latch to prevent unlatching the latch by a passenger.

Finally, British Patent Publication No. 2,292,126 published on Feb. 14, 1996 to Rover Group Limited, titled "Central Acceleration Measuring System For Vehicles," describes an accelerometer system for detecting abnormal accelerations and decelerations in an automobile, for triggering various safety systems (airbags, seat belt tensioners, fuel cutoffs, etc.). However, there is no disclosure in the '126 British Patent Publication of any means for positively locking a seat belt latch assembly to prevent unlatching the assembly by the person wearing that seat belt, as is provided by the present invention.

None of the above inventions and patents, taken either singularly or in combination, is seen to describe the instant invention as claimed. Thus an airline passenger management system solving the aforementioned problems is desired.

SUMMARY OF THE INVENTION

The present invention is an airline passenger management system, including means for preventing a passenger(s) from unlatching their seat belt(s). The present system includes a monitoring system for monitoring the belt latch status of any or all passengers as desired, and selectively releasing individual belt latches to allow limited passenger movement about the cabin. The present passenger management system includes a novel seat belt latch assembly including a mechanism for selectively preventing a passenger from unlatching the belt latch to remove the belt, once the latch has been latched and locked by the computer based information system or the cockpit crew.

The monitoring system includes one or more panels for indicating the status of all seats and belt latches on board the aircraft, i.e., seat occupied or unoccupied, belt unfastened, loosely fastened, or tightly fastened, and whether or not the positive lock is engaged for each of the belt latches, to prevent the associated passenger from releasing his or her latch and leaving their seat. While such a display panel within the passenger cabin does not include any means for releasing the positive latch lock mechanisms of the passenger seat belts, a corresponding panel(s) or other display and/or control panel (interactive computer screen, etc.) on the flight deck includes means for releasing the positive belt latch locking means as desired. In this manner, no one in the passenger cabin, including flight attendants, may cause any of the latch mechanisms to be released. However, the present system includes automatic release means for emergencies, gate arrivals, etc., and the flight attendants may also monitor the system and request release of one or more passenger belt positions as desired, according to predetermined codes to the flight deck.

Each passenger position also includes a series of status lights indicating the status of their seat belt, as well as a release request control. A database may be provided, including various statistics about each passenger and assigning a corresponding risk level code to each passenger. This database may be communicated from the ground based computer system to the computer system in the aircraft. Alternatively, a crew member may input the passenger information from a computer disc (or other suitable information media) upon boarding the aircraft.

Accordingly, it is a principal object of the invention to provide an airline passenger management system, for selectively and positively securing and retaining passengers within their seats as desired by the flight and/or cabin crew, and for selectively releasing one or more of the passengers for limited excursions about the cabin during flight.

It is another object of the invention to provide such a system including means for monitoring the status of each passenger seat and seat belt, and for controlling the seat belt latch release mechanisms of each passenger seat belt from a remote location on the flight deck of the aircraft.

It is a further object of the invention to provide such a system including an individual passenger status indicator for each passenger position, including release request means for each passenger position.

Still another object of the invention is to provide such an integrated control system including a passenger database having data for each passenger on board the aircraft, and determining a corresponding risk level for each passenger, depending upon the data for that passenger.

It is an object of the invention to provide improved elements and arrangements thereof for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises an airline passenger management system, for selectively controlling and monitoring the movement of passengers in the passenger cabin of an airliner while in flight. The present system includes a remotely operable mechanism in each passenger seat belt latch assembly, for disabling the latch release mechanism according to a predetermined computer program or as desired by the flight or cabin crew of the aircraft. The present system includes annunciator and/or display panels in both the passenger cabin and flight deck of the aircraft, whereby flight attendants and/or flight crew may monitor the seating and seat belt status of all passengers on board. However, only the flight crew, physically separated from the passenger cabin, has access to any seat belt release means of the system. The system may also include a database which assigns a risk level to each passenger, depending upon their background, etc. The computer control system may then provide for the selective release or restraint of passengers in accordance with the software algorithms which are customized in accordance with airline needs.

Figure 1:
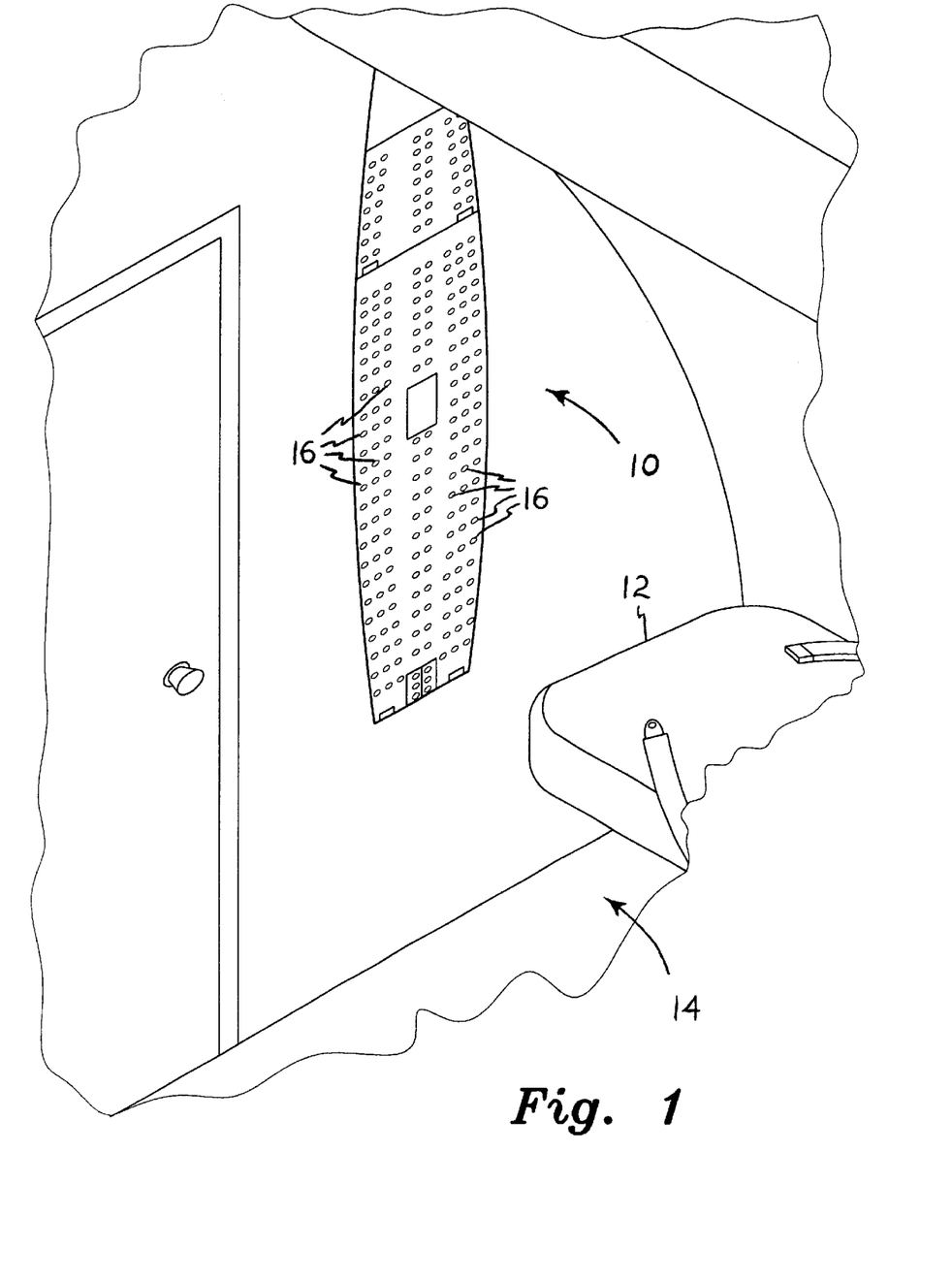
FIG. 1 is an environmental perspective view of a passenger status monitoring panel in accordance with the present airline passenger management system.

FIG. 1 is an illustration of an exemplary passenger seating and seat belt status annunciator panel 10, located adjacent a cabin crew seating station 12 in the passenger cabin 14 of an airline aircraft. The annunciator panel 10 includes a series of individual passenger status indicators 16, with one such indicator 16 corresponding to each conventional passenger seat in the cabin of the aircraft. Alternative means may be provided for such a status annunciator system, e.g., computer monitor screen, etc.

Figure 2:
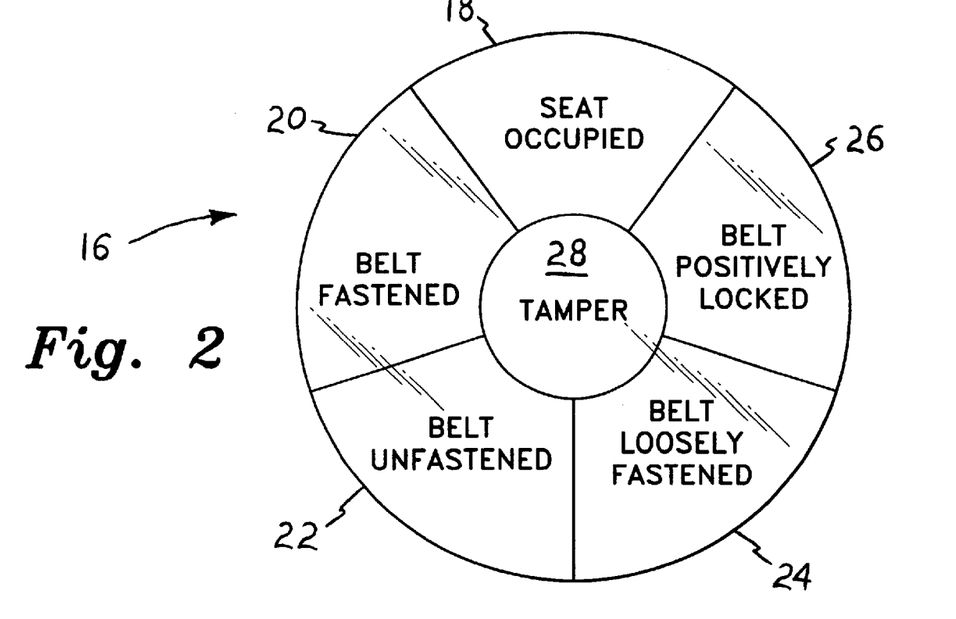
FIG. 2 is a detailed view of a single passenger position status indicator of the panel of FIG. 1, showing its features.

FIG. 2 provides a detailed view of a single passenger seating and seat belt status indicator 16, showing the various conditions which may occur and to which the cabin and/or flight crew should be alerted. While the status indicator 16 of FIG. 2 is circular, this pattern is merely exemplary; any practicable display configuration may be provided as desired. The status indicator 16 includes a series of six lights, each indicating a different condition.

The upper light position 18, i.e., "seat occupied," is illuminated whenever the weight of a passenger is resting in the passenger seat. (It will be understood that while no passenger seats are illustrated in the present disclosure, they are otherwise conventional, and may be configured similarly to the flight crew seat 12 of FIG. 1.) The seat occupied light 18 is actuated by means of a conventional weight detection circuit, such as that disclosed in U.S. Pat. No. 3,351,381 issued on Nov. 7, 1967 to Oliver W. Boblitz, titled "Automatic Safety Belt Devices," discussed further above in the Description of the Related Art, with such disclosure being incorporated herein by reference.

Figure 5A:
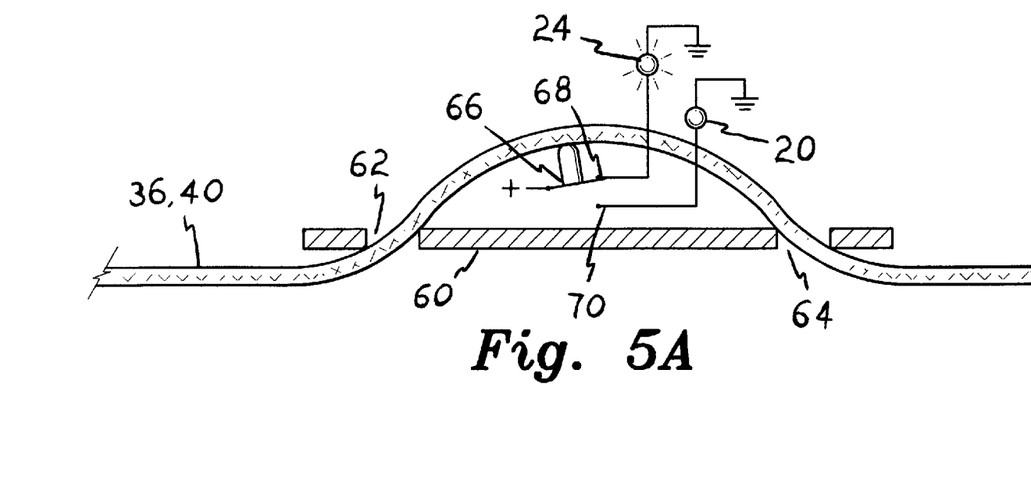
FIG. 5A is a side elevation view in section of a seat belt tension indicator for use with the present invention, showing an indication of the belt in a loosely secured state.
Figure 5B:
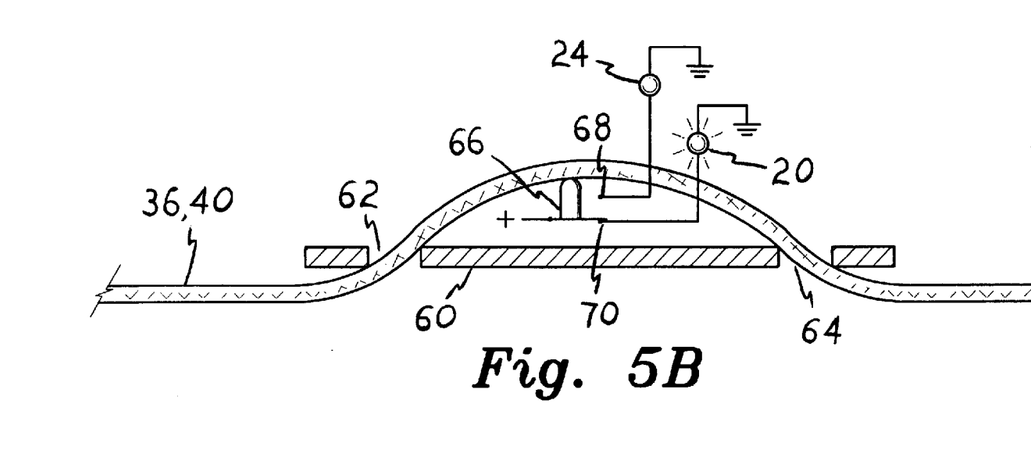
FIG. 5B is a side elevation view of the tension indicator of FIG. 5A, showing an indication of a tightly secured belt.

The upper left light 20, i.e., "belt fastened," provides notification to the cabin and/or flight crew that the passenger positioned in the corresponding seat has his or her seat belt securely fastened. This system may make use of conventional circuitry, as disclosed in the Takada '272 U.S. Patent ("Motor Vehicle Safety Devices") discussed further above. FIGS. 5A and 5B of the present disclosure also illustrate a mechanism for such a system, with its operation discussed further below.

The lower left or "Belt Unfastened" light 22 serves to alert the cabin and/or flight crew that the corresponding passenger has not latched his or her seat belt. The circuitry operating this system is conventional and is incorporated in all modern automobiles. An example of such circuitry is disclosed in the Takada '272 U.S. Patent discussed further above, and is incorporated herein by reference. This light circuitry is also wired in series with the "Seat Occupied" circuit 18. Thus, if the seat is not occupied, the "Seat Occupied" circuit will remain open, with other seat belt annunciator systems remaining inactive.

The lower right or "belt loosely fastened" light 24 provides a signal to notify the cabin and/or flight crew that the corresponding passenger has his or her seat belt latched, but that the belt is not tightened securely. The electromechanical system for actuating this light 24 is illustrated in FIGS. 5A and 5B of the present disclosure, and discussed in detail further below. This light 24 is actuated by means of a double throw switch, with the opposite throw serving to close the "Belt Fastened" light 20 when the seat belt is tightly fastened. Thus, either the "Belt Fastened" light 20 or the "Belt Loosely Fastened" light 24 may be illuminated, but they will not be illuminated simultaneously.

Figure 4A:
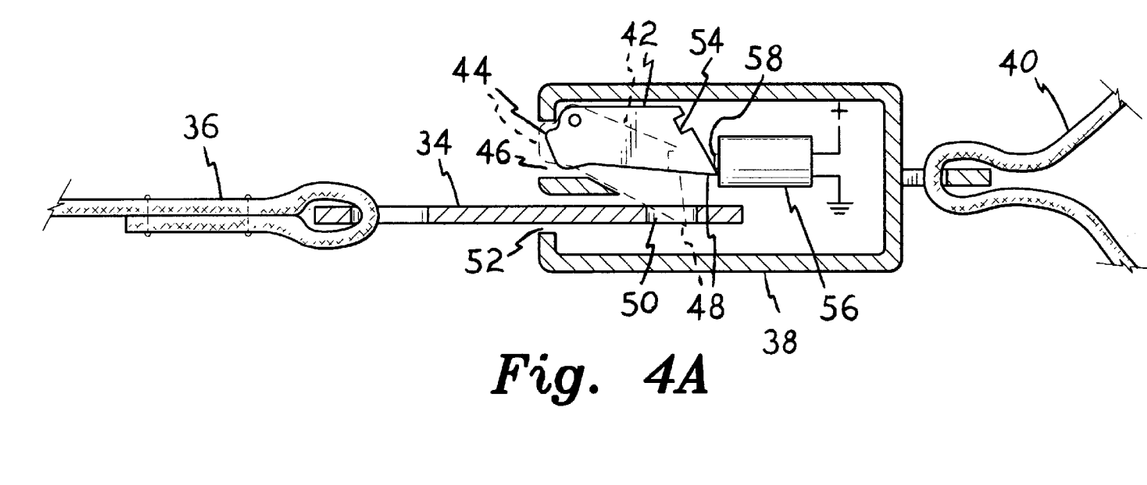
FIG. 4A is a side elevation view in section of the latch release selective lockout mechanism and passenger seat belt latch assembly used with the present invention, showing the lockout mechanism in a retracted state to permit release of the latch.
Figure 4B:
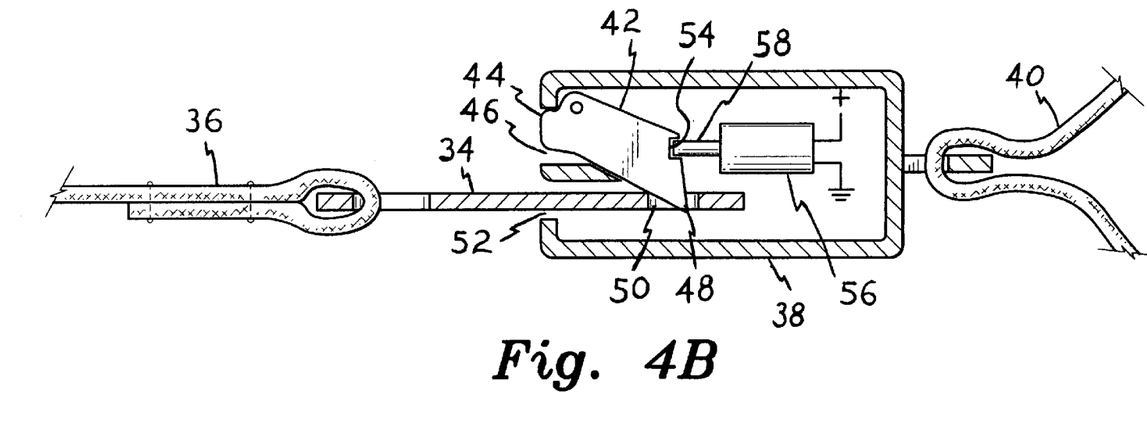
FIG. 4B is a side elevation view in section of the lockout mechanism and latch assembly of FIG. 4A, showing the mechanism in a positively locked state for preventing release of the latch.

A "Belt Positively Locked" light 26 is also provided to indicate that the corresponding seat belt latch is (a) latched, and (b) cannot be unlatched and opened by the passenger. The mechanism for accomplishing this function is illustrated in FIGS. 4A and 4B of the drawings, and described in detail further below.

Finally, a "Tamper" warning light 28 is provided with the individual seat and belt status annunciator panel 16. This warning light is connected electrically with the other various lights and circuitry 18 through 26, and is only activated if an open circuit is detected in the wiring running through the seat belt webbing itself. This tamper detection circuit and light 28 may be installed in series with the "seat occupied" switch and light 18, thus remaining inactive so long as there is no weight in that passenger seat. The "Tamper" circuit and light may be controlled by a conventional normally closed solenoid, which actuates the tamper warning light 28 when any of the circuits are opened.

Figure 3:
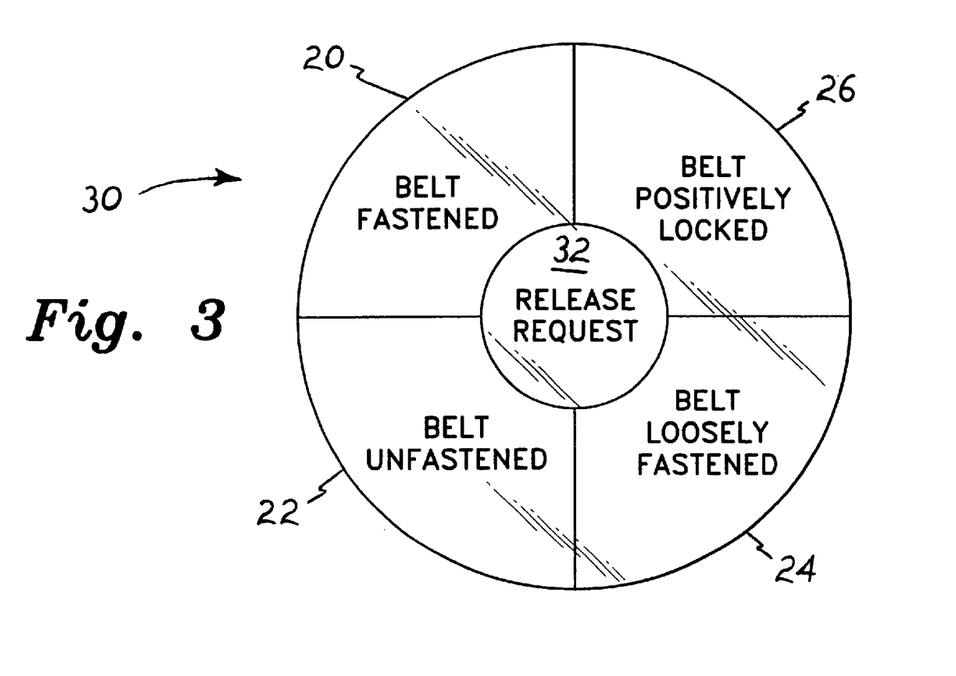
FIG. 3 is a detailed view of a single individual passenger status indicator, one of which is provided at each seat position.

FIG. 3 provides an exemplary illustration of an individual passenger seat belt latch status annunciator panel 30. Each seating position includes such an individual panel 30, which may be located upon the seat back in front of each corresponding passenger position, or in any other suitable location. The individual status panel 30 need not include all of the warning light systems of the passenger status indicator panel 16 of the master annunciator panel 10, as there is obviously no need for a "Seat Occupied" indicator for each individual seat. In addition, as any tampering with the system is due to deliberate action by the corresponding passenger, no separate "Tamper" light is provided for the individual passenger status indicator panels 30. However, the "Belt Fastened" light 20, "Belt Unfastened" light 22, "Belt Loosely Fastened" light 24, and "Belt Positively Locked" light 26 correspond to those lights 20 through 26 of the passenger and seat belt status indicator panel 16.

In addition to the four annunciator lights 20 through 26 of the individual passenger seat belt and latch status indicator panel 30, a fifth "Release Request" control 32 (e.g., pushbutton contact, etc., similar to the conventional flight attendant call button in an airliner aircraft) is provided. The Release Request button does nothing to actually open or release the seat belt latch assembly of the passenger. However, it does close a circuit to send a signal to the master annunciator panel on the flight deck of the aircraft, alerting the control system and/or flight crew that the corresponding passenger wishes to have the positive lock of his or her seat belt latch released, so he or she may leave the seat (e.g., exercise, restroom, etc.). A passenger(s) may request to leave his or her seat by using the corresponding queueing button at his or her seat position. The seat belt latch assembly or assemblies of the corresponding passenger(s) is/are released based upon their place in the queue. However, the system ensures that only one high risk passenger is moving about the cabin at any time.

FIGS. 4A and 4B illustrate an exemplary system for disabling the latch release mechanism of a passenger seat belt. The mechanism illustrated in FIGS. 4A and 4B essentially includes a latch tongue 34 connected to the distal end of a flexible first or latch tongue portion seat belt 36, and an opposite buckle housing 38 connected to a flexible second or buckle portion seat belt 40. The buckle mechanism or housing 38 includes a belt tongue engagement tang 42 pivotally mounted therein. The belt tongue engagement tang 42 has a release button 44 which is accessible from the exterior of the buckle housing 38 by a passage 46. The tang 42 is spring loaded (the conventional spring is not shown, for clarity in the drawings) to the engaged position, whereupon the distal end 48 drops into a slot 50 in the latch tongue 34 to retain the latch tongue 34 within the housing 38 when the latch tongue 34 is inserted into the housing 38 through the belt tongue passage 52.

The above described seat belt latch mechanism is largely conventional, and it will be seen that many alternative mechanisms may be substituted for that described above, as desired. However, the mechanism of FIGS. 4A and 4B also includes means for preventing release of the fastened seat belt latch assembly by the passenger, and for remotely and selectively disengaging the release prevention means as desired. Thus, the passenger secured in his or her seat by means of the seat belt mechanism of FIGS. 4A and 4B, cannot release his or her seat belt latch mechanism when the release mechanism is remotely disabled, in accordance with the present invention. Only when the latch release mechanism is remotely set to the release condition, can the passenger release his or her belt if so desired. It will be noted that the belt tongue engagement tang 42 includes a locking slot 54 formed in its distal end 48. A release locking solenoid 56 has a pin 58 which selectively engages the slot 54 of the engagement tang 42 when the engagement tang 42 is in its normal position, with the distal end 48 engaging the slot 50 of the inserted latch tongue 34 of the belt assembly. The solenoid pin 58 is normally retracted when no electrical power is applied to the solenoid 56, to preclude engagement of the pin 58 with the locking slot 54 of the engagement tang 42 unless electrical power is applied to the solenoid 56. This assures that the seat belt tongue 34 may be freely released from the latch housing 38 in emergency situations where electrical power is lost and/or upon gate arrival, etc., merely by shutting off electric power to the seat belt system.

FIG. 4A illustrates the present seat belt release prevention 20 mechanism as would be the case with no electrical power applied to the solenoid 56, i.e., when the latch engagement pin 58 is retracted. This allows the seat belt tongue engagement tang 42 to be pivoted from its normal position (shown in solid lines) to its release position (shown in broken lines in FIG. 4A), against the pressure of the conventional spring which normally holds the tang 42 in its engaged position to secure the seat belt tongue 34 within the housing 38 until the user positively releases the mechanism by pressing on the tang release button 44. Thus, the person wearing the seat belt assembly of FIGS. 4A and 4B has complete control over whether the latch assembly was engaged or disengaged, when the solenoid 56 is in its deactivated state as shown in FIG. 4A. This would be the case any time electrical power is discontinued to the solenoid 56.

However, whenever electrical power is applied to the solenoid 56, the pin 58 is driven outwardly. If the latch engagement tang 42 is in its normal position, i.e., engaging the slot 50 of the installed seat belt latch tongue 34, the end of the pin 58 engages the slot 54 in the back of the tang 42, thereby preventing movement of the tang 42 within the seat belt buckle housing 38. This prevents the passenger from being able to release the seat belt latch tongue 34 from the buckle housing 38, thereby retaining the passenger within his or her seat so long as electrical power is applied to the solenoid 56.

However, the present invention does consider passenger comfort during the positive locking of the mechanism. Passengers are permitted to loosen their belts (although they cannot release them completely), thereby providing them with some limited movement within their seats. An electrical mechanism provides an indication of the status of the belt tension (loose or tight) to the corresponding belt status indicators 16 of the annunciator panel 10 of FIG. 1, as well as to the corresponding individual passenger seat belt status display panel 30 as shown in FIG. 3, with either the "Belt Fastened" light 20 or the "Belt Loosely Fastened" light 24 being illuminated, depending upon the belt tension.

The tension indicator mechanism of FIGS. 5A and 5B includes a bracket 60, with the belt webbing 36 or 40 (depending upon which portion of the belt the bracket 60 is installed) passing through the two slots 62 and 64 thereof. A double throw switch 66 is installed between the belt webbing 36 or 40 and the bracket 60. When the belt is loosely fastened, as indicated in FIG. 5A, the switch 66 closes the first pole contact 68 to illuminate the "Belt Loosely Fastened" light 24 of the individual annunciator panels 16 and 30 of FIGS. 2 and 3 (with the light 24 also shown in FIGS. 5A and 5B). However, when the belt is snugged up tightly, the webbing 36 or 40 is drawn more tightly across the bracket 60, thereby closing the second pole contacts 70 to cause the "Belt Fastened" light 20 of the panels 16 and 30 of FIGS. 2 and 3 to illuminate (with the light 20 also shown in FIGS. 5A and 5B), indicating the belt tension status to the passenger and others monitoring the system.

Figure 6:
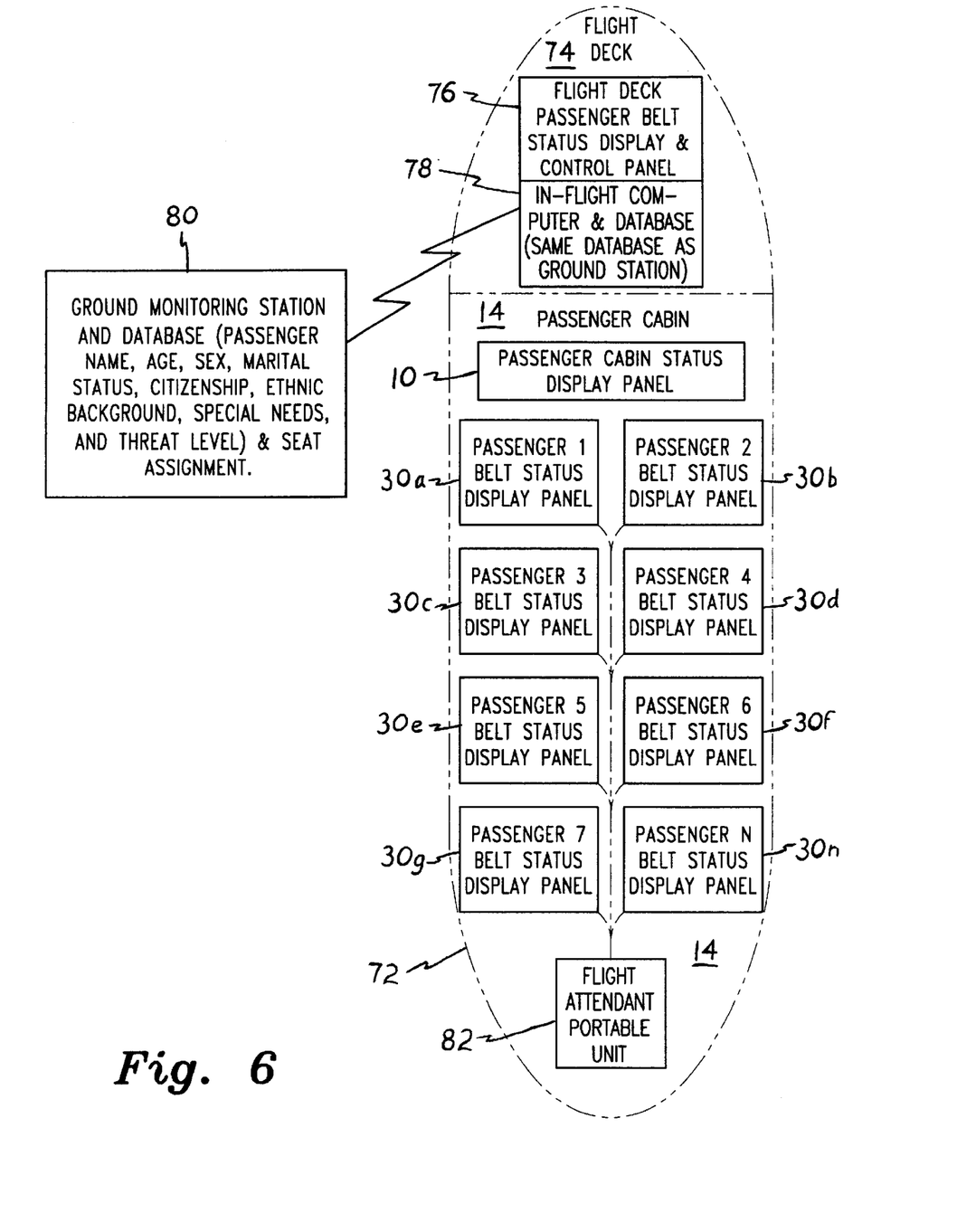
FIG. 6 is a block diagram of the basic components of the present airline passenger management system.

FIG. 6 of the drawings provides a block diagram of the basic components of the present airline passenger management system. In FIG. 6, the fuselage 72 of an airline aircraft is shown schematically in dashed lines. The airline aircraft fuselage 72 includes a passenger cabin 14 (a portion of which is illustrated in FIG. 1) having at least one (and nearly universally a series of) passenger seat(s) therein, as is known conventionally in the field. The passenger seat(s) may be essentially the same as the cabin crewmember seat 12 illustrated in FIG. 1 of the drawings. A passenger cabin status annunciator or display panel 10 is also located in the passenger cabin area 14, where it is visible to the flight attendant(s) working the passenger cabin area 14.

The conventional flight deck area 74 at the front of the aircraft 72 also contains a master passenger seat belt and latch status annunciator or display and control panel 76. This panel 76 is interconnected with all of the passenger seat belt systems, and provides essentially the same information and may have essentially the same appearance as the passenger seat belt and latch status display panel 10 of the passenger cabin area 14 shown in FIG. 1. However, the flight deck panel 76 may also include means for selectively releasing one or more of the positive lock solenoids of the passenger seat belt latch mechanisms illustrated in FIGS. 4A and 4B. This can be accomplished conventionally, via a series of conventional switches corresponding to the seat belt latch for each of the passenger seats in the passenger cabin, by merely opening the circuit to disable the solenoid for the belt latch in question.

However, the primary system is a conventional computer networked system 78 with monitor and keyboard may serve as the control means for the seat belt latch series in the passenger cabin of the aircraft, particularly for larger aircraft. Conventional touch screen systems or programs may be used to monitor the status of individual passengers and their seat belt status, and/or different areas of the passenger cabin, etc. This system enables the flight crew to selectively release (or refrain from releasing) any specific passenger seat belt latch(es) as desired during a flight. (It will be seen that particularly in larger aircraft, a dedicated member of the crew, e.g., sky marshal, etc., will likely hold full authority for the monitoring and control of the passenger seat belt system of the present invention.)

The airborne computer control system 78 also includes a passenger database which is loaded into the computer system before each flight. The database is constructed at the time of passenger ticket sales, and includes information on each ticketed passenger relating to the passenger's name, age, sex, marital status, citizenship, ethnic background, and special needs, and determines a threat or risk level for each passenger, based upon the above factors (and possibly others as well). For example, a small, elderly woman would not likely present nearly as high a risk or threat as would a young, single adult male having citizenship from a country known to harbor terrorist activities. The computer program of the present system can consider all of the above factors in determining a risk level for each passenger. Passengers are released from their seats based upon the order of their release requests, except that no more than one high risk passenger is released at any one time to move about the cabin. This control feature is built into the computer database program.

The computer database is preferably developed on the ground at the time of passenger ticket sales, as noted above. Preferably, this data is provided to a ground based computer system and monitoring station 80, which in turn provides the information to the airborne system 78 via a datalink. In this manner, the airborne system can be upgraded and revised as necessary up to the time of departure, as last minute changes occur in seat assignments, cancellations, etc. In a similar manner, the airborne system 78 may communicate with the ground based system 80 to update the ground system 80 regarding any different seating requests made by passengers, unusual requests or actions, etc. If such in flight requests or actions by one or more passengers indicate some undesirable pattern to the ground based system 80, the airborne system and flight crew (sky marshal) is advised via the datalink system.

The cabin attendant(s) may monitor the status of the passenger display panel 10 (there may be more than one such panel 10, in larger aircraft), and/or via a portable, hand held device 82 which may be carried by each attendant. The portable unit 82 is essentially a conventional small radio transceiver through which the flight attendant may request information regarding a specific passenger according to the seat assignment, and/or other information which may be contained within the database. The information may be provided via a small display screen, as is conventionally done in small, hand held wireless computer devices.

The in-flight computer system 78 used with the present invention preferably also includes a system for selectively releasing one or more passenger seat belt locks, in order to allow some limited freedom of movement to passengers in the cabin, e.g., for restroom breaks, etc. The system does not permit the release of all passenger seat belt locks at any one time (except upon gate arrival or in an emergency, when electrical power to the belt lock solenoids is interrupted). However, the system considers the threat or risk level potential of each passenger based upon the demographics provided to the computer at the time of ticket sales, and permits a relatively small number of passengers to release their seat belt latches at any one time to walk about the cabin.

For example, the elderly lady and young single man described above might be assigned a relatively low risk level of one and a relatively high risk level of five, respectively. All passengers would have some risk or threat level factor assigned to them. The computer system 78 considers these passenger risk level factors when determining selective release of the seat belt latch release prevention system of the present invention. The system may be programmed to allow no more than one high risk level passenger to leave his seat at one time, while two, three, or more lower risk passengers may be up and about simultaneously with the high risk passenger, or at a different time. The automated program assures that all passengers are permitted to leave their seats for at least some short period of time during the flight, while assuring that freedom of potentially threatening passengers is minimized and monitored.

Figure 7:
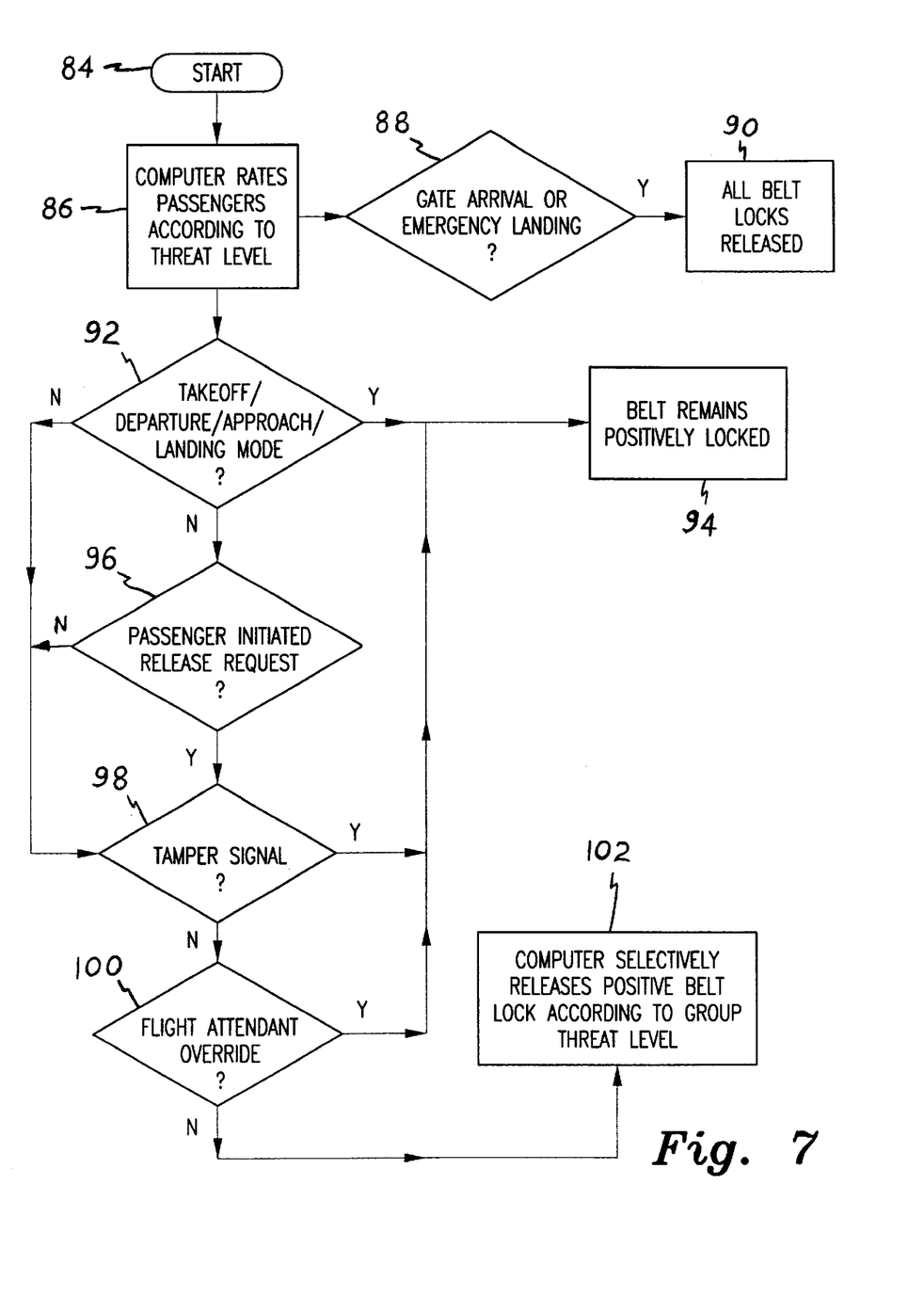
FIG. 7 is a flow chart showing the basic operation of the present airline passenger management system.

FIG. 7 provides a flow chart showing the various steps involved in determining release (or non-release) of the passenger seat belt latch locking mechanisms of the present invention. After the computer and security system are initially activated, as indicated by the "Start" step 84 at the top of FIG. 7, the computer evaluates the database to rate each of the passengers according to their individual threat or risk levels in accordance with their individual demographics, as indicated by the next step 86 of FIG. 7.

The present system relies upon positive electrical power to each of the passenger seat belt latches in order to be able to hold the latches in a positively locked state to prevent their release the event of boarding, gate arrival at the end of a flight, or any emergency where prompt release of passengers is critical, the present system terminates electrical power to the latches to permit passengers to release all latches, as indicated by steps 88 and 90 in FIG. 7.

Otherwise, the seat belt latch locking mechanisms of the present invention remain locked at all times, unless either the computer or a flight crewmember in the physically separate flight deck area intervenes to allow release of one or more belt latch locks. For example, it is important that all passenger seat belts remain secured throughout the taxi, takeoff, departure, approach, and landing modes. The computer of the present system is easily programmed to recognize these areas of operation and does not permit release of any of the belts during such operations, as indicated by steps 92 and 94 of FIG. 7.

In the event that a passenger wishes to leave his or her seat, as indicated by step 96 of FIG. 7, the passenger may initiate such a request by activating the release request button 32 of their individual status display panel 30, as shown in FIG. 2 of the drawings. This sends a signal to the master display and control panel 76 and/or computer and database 78 installed on the flight deck 74 of the airliner 72, as shown schematically in FIG. 6.

The computer 78 (or member of the flight crew) considers various factors involved in the release request, e.g., the length of time since this passenger was last released, the number and risk or threat level of other passengers who are currently released, etc., including a check to determine if there is any indication of tampering with the system by the person making the release request, as indicated by step 98 of FIG. 7.

At this point, the computer may provide an alert to the cabin attendant(s) that the passenger has requested release, and that the system is about to allow release. This will give the cabin attendant(s) the opportunity to override the release as shown by step 100 of FIG. 7, if in the opinion of the cabin attendant there is some reason the passenger should not be released. This is accomplished by means of the portable passenger monitoring unit(s) 82 held by the flight attendant(s), shown schematically in FIG. 6.

Assuming that there is no override from the flight attendant, and that the release consideration sequence has not determined any reason not to release the seat belt positive lock in question, then the computer may selectively release that passenger's positive belt lock, in accordance with step 102 of FIG. 7. The passenger is notified of this release when the "Belt Positively Locked" light 26 of his or her individual status indicator panel 30 (shown in FIG. 3) is extinguished, thereby alerting the passenger that he or she may release his or her belt latch and leave the seat.

The present system is configured to allow a number of passengers having a total threat or risk quotient, to walk about the passenger cabin at any given time during the cruise phase of flight. Thus, even if a passenger has not initiated a release request, the present system may selectively release the positive lock mechanisms of one or more passengers, in accordance with the factors described above. The released passenger(s) may or may not wish to take advantage of the release, as desired.

Normally, passengers are allowed time (e.g., five minutes) to walk, visit the restroom, etc. The system may also have a detector to determine if one or more of the restroom doors have been locked, thus indicating that the restroom is in use. The in use indication may also be considered by the computer system in determining the number of passengers allowed release, as most passengers wish to use the restroom when they are out of their seats on a flight. If the restroom is already in use, there may be no point in releasing additional passengers until the restroom is again free.

In the event that a passenger remains out of his or her seat for longer than the allotted amount of time, the present system provides an alert to the passenger attendant(s) noting the name and/or seat assignment, etc. of the passenger in question. The flight attendant(s) may check the restroom(s) for that passenger, and/or require the passenger to return to his or her seat, perhaps with the assistance of the sky marshal on board.

In conclusion, the present airline passenger management system provides a means to ensure that all passengers are positively secured within their assigned seats at all times during critical phases of flight. The present system further releases only a relatively few passengers at any one time during the cruise phase of flight, thus greatly reducing or eliminating the potential for a group of passengers to commandeer an airliner for terrorist purposes. The use of a computerized database and program enables the system to rapidly consider the needs of passengers, as well as the potential risks, at all times, thereby providing an essentially seamless operation which assures safety for persons in the air and on the ground alike.

It is to be understood that the present invention is not limited to the embodiment described above, but encompasses any and all embodiments within the scope of the following claims.

I claim:

1. An airline passenger management system, comprising:
    at least one seat belt and latch assembly including means for selectively preventing the release thereof when fastened;
    at least one master annunciator panel communicating with said at least one seat belt and latch assembly, and providing passenger seat belt status;
    at least one master control panel communicating with said at least one seat belt and latch assembly, and providing passenger seat belt status; and
    means for remotely enabling and disabling said means for selectively preventing the release of said at least one seat belt and latch assembly, as desired.

2. The airline passenger management system according to claim 1, wherein said at least one master annunciator panel further includes means for indicating seat occupied, seat belt fastened, seat belt unfastened, seat belt loosely fastened, and seat belt positively locked for each said seat belt and latch assembly.

3. The airline passenger management system according to claim 1, wherein said at least one master control panel further includes said means for remotely enabling and disabling said means for selectively preventing the release of said at least one seat belt and latch assembly.

4. The airline passenger management system according to claim 1, further including at least one individual passenger seat belt latch status annunciator panel.

5. The airline passenger management system according to claim 1, wherein said means for remotely enabling and disabling said means for selectively preventing the release of said at least one seat belt and latch assembly comprises an automated system.

6. The airline passenger management system according to claim 5, wherein said automated system further includes:
    at least one individual passenger database; and
    means for determining at least one individual passenger risk level according to said at least one individual passenger database.

7. The airline passenger management system according to claim 5, wherein said automated system further includes:
    a ground based database; and
    an aircraft based database and computerized control system.

8. The airline passenger management system according to claim 1, further including means for detecting passenger tampering with said at least one seat belt and latch assembly.

9. The airline passenger management system according to claim 1, further including portable flight attendant passenger monitoring means.

10. The airline passenger management system according to claim 1, wherein said at least one seat belt and latch assembly comprises:
    a flexible first belt portion having a distal end with a belt tongue extending therefrom;
    a flexible second belt portion having a distal end with a housing extending therefrom;
    a belt tongue passage disposed within said housing;
    a pivotally mounted belt tongue engagement tang disposed within said housing, for selectively engaging said belt tongue and securing said first belt portion and said second belt portion together; and
    a release locking solenoid disposed within said housing, for selectively engaging said belt tongue engagement tang and precluding movement thereof for selectively locking said belt tongue engagement tang immovably in place and precluding release of said belt tongue from said housing.

11. An airline passenger management system, comprising:
    an airline aircraft having at least a flight deck, a passenger cabin, and at least one passenger seat;
    a seat belt and latch assembly for said at least one passenger seat, including means for selectively preventing the release of said seat belt and latch assembly when fastened;

at least one master annunciator panel disposed within said passenger cabin and communicating with said at least one seat belt and latch assembly, and providing passenger seat belt status;

at least one master annunciator and control panel disposed within said flight deck and communicating with said at least one seat belt and latch assembly, and further providing passenger seat belt status and control of said means for selectively preventing the release of said seat belt and latch assembly; and means disposed within said flight deck for remotely enabling and disabling said means for selectively preventing the release of said at least one seat belt and latch assembly, as desired.

12. The airline passenger management system according to claim 11, wherein said at least one master annunciator panel further includes means for indicating seat occupied, seat belt fastened, seat belt unfastened, seat belt loosely fastened, and seat belt positively locked for each said seat belt and latch assembly.

13. The airline passenger management system according to claim 11, wherein said at least one master control panel further includes said means for remotely enabling and disabling said means for selectively preventing the release of said at least one seat belt and latch assembly.

14. The airline passenger management system according to claim 11, further including at least one individual passenger seat belt latch status annunciator panel for said at least one passenger seat and said seat belt and latch assembly.

15. The airline passenger management system according to claim 11, wherein said means for remotely enabling and disabling said means for selectively preventing the release of said at least one seat belt and latch assembly comprises an automated system.

16. The airline passenger management system according to claim 15, wherein said automated system further includes:

at least one individual passenger database; and means for determining at least one individual passenger risk level according to said at least one individual passenger database.

17. The airline passenger management system according to claim 15, wherein said automated system further includes:

a ground based database; and an aircraft based database and computerized control system.

18. The airline passenger management system according to claim 11, further including means for detecting passenger tampering with said at least one seat belt and latch assembly.

19. The airline passenger management system according to claim 11, further including portable flight attendant passenger monitoring means.

20. The airline passenger management system according to claim 11, wherein said at least one seat belt and latch assembly comprises:

a flexible first belt portion having a distal end with a belt tongue extending therefrom;

a flexible second belt portion having a distal end with a housing extending therefrom;

a belt tongue passage disposed within said housing;

a pivotally mounted belt tongue engagement tang disposed within said housing, for selectively engaging said belt tongue and securing said first belt portion and said second belt portion together; and a release locking solenoid disposed within said housing, for selectively engaging said belt tongue engagement tang and precluding movement thereof for selectively locking said belt tongue engagement tang immovably in place and precluding release of said belt tongue from said housing.

* * * * *